United States Patent [19]

Julstrom

[11] Patent Number: 4,991,166
[45] Date of Patent: Feb. 5, 1991

[54] ECHO REDUCTION CIRCUIT

[75] Inventor: Stephen D. Julstrom, Chicago, Ill.

[73] Assignee: Shure Brothers Incorporated, Evanston, Ill.

[21] Appl. No.: 264,145

[22] Filed: Oct. 28, 1988

[51] Int. Cl.$^5$ ............................................. H04M 9/08
[52] U.S. Cl. .................................. 370/32.1; 379/388; 379/390; 379/406
[58] Field of Search ............... 379/388, 389, 390, 406, 379/407, 409

[56] References Cited

U.S. PATENT DOCUMENTS

| | | | |
|---|---|---|---|
| 3,751,602 | 8/1973 | Breeden | 379/389 |
| 3,963,868 | 7/1976 | Randmere et al. | 379/390 |
| 3,970,786 | 7/1976 | Randmere et al. | 379/390 |
| 4,051,325 | 9/1977 | Mafune et al. | 379/390 X |
| 4,490,582 | 12/1984 | Munson | 379/390 |
| 4,527,014 | 7/1985 | Styrna | 379/392 X |
| 4,731,832 | 3/1988 | Brossaud et al. | 379/389 |

Primary Examiner—Jin F. Ng
Assistant Examiner—Jhancy Augustus
Attorney, Agent, or Firm—Allegretti & Witcoff

[57] ABSTRACT

An echo reduction circuit that may be used to reduce the returned echo in communication links with significant delay. By making effective use of the echo-masking effect of near-simultaneous desired speech energy and the redundancy present in normal speech, the circuit makes possible wide bandwidth, non-choppy, perceived distortion-free, and perceived echo-free teleconferencing. The circuit performs a rapid time constant, semi-waveform-following partial attenuation of a preemphasized version of the returning transmit signal proportional to a calculation of the likely strength of the returned echo in relation to the strength of the local speech.

10 Claims, 2 Drawing Sheets

ECHO REDUCTION CIRCUIT

BACKGROUND OF THE INVENTION

The present invention relates to a system for reducing the returned echo in speech communication links with significant signal path delay, such as satellite links. More particularly, it relates to reducing the returned echo in such links resulting from the loudspeaker-to-microphone acoustical coupling in a room teleconference installation.

Coupling from the receive signal path to the transmit signal path at the near end facility (e.g. a telephone network central office termination or a room teleconference installation) of a communication link causes a far-end talker's speech to be returned to him. If the link has significant delay, such as about one-half second round trip for a typical satellite connection, he will perceive this as an annoying echo. This echo can make talking difficult or even impossible.

A four-wire (separate transmit and receive signal paths) to two-wire (combined transmit and receive signal paths) conversion hybrid's imperfect balancing to the two wire line at the end-point facility in the telephone network is the usual cause of the unwanted receive path-to-transmit path signal coupling. The signal is typically coupled through this transhybrid path with an average attenuation over the telephone bandwidth (300 to 3 kHz) of 6 to 20 dB.

Coupling from the receive path to the transmit path also occurs in four-wire-only installations such as satellite video-teleconferencing facilities. The coupling occurs acoustically in the room when loudspeaker sound produced by the receive signal reaches open (active) microphones, responsively producing unwanted transmit signal. Due the practical difficulty of obtaining acoustical isolation of the microphones from the loudspeaker, the attenuation from receive to transmit is never more than the minimum required for stability of the overall feedback loop formed by both ends of the conference: 3 to 6 dB at the worst case frequency and 6 to 9 dB averaged over the wider satellite audio bandwidth. Acoustical reflections in the room result in a longer impulse response for the loudspeaker-to-microphone coupling than is the case with the electrical transhybrid path.

Similar techniques have been employed in the prior art to reduce both the electrical coupling and the acoustical coupling and, therefore, the resultant echo perceived by the far-end talker. Most often an "echo suppressor" device has been used. Its basic operation in relation to reducing the hybrid-induced echo has been described by Fang ("Voice Channel Echo Cancellation", *IEEE Communications Magazine*, Dec. 1983): "An echo suppressor is essentially a voice-operated electronic switch that compares the voice signals traveling in both directions during a long-distance conversation . . . The suppressor decides which person is talking at any given time, and blocks the signal traveling in the opposite direction." These direction and suppression decisions are made with syllabic-based time constants of at least 50 millisecond. While this technique can eliminate echo during single-talk (one end only talking), there is a problematic tradeoff during double-talk (both ends talking) between "chopping" speech and reducing the amount of echo suppression (attenuation) applied.

The suppressor function has also been utilized in "speakerphone" devices to reduce the strong loudspeaker-to-microphone coupling to maintain feedback stability (prevent howling) when connected to the telephone system. The high level of suppression typically required (40 dB or more), even during double-talk, results in choppiness and poor interactivity. These problems are minimized in the teleconference system of Julstrom (U.S. Pat. No. 4,712,231) in conjunction with the automatic microphone control techniques of Anderson et. al. (U.S. Pat. No. 4,489,442) or Julstrom (U.S. Pat. No. 4,658,425), all owned by the same entity as the present application. Multiple directional microphones are automatically "gated ON" (made active) in response to local (near-end) speech, allowing optimized acoustical design, minimized loudspeaker-to-microphone coupling, and reduced amounts of suppression (conversational directional controlled attenuation), possibly down to 0 to 6 dB in ideal rooms. In installations needing higher suppression settings of up to 30 dB, subjective choppiness is minimized as much as possible by the interactive, interrupt-priority direction switching logic.

This system can also be used with delayed communication links, as are present in satellite videoconferences. The microphones remain gated OFF in the absence of local speech, breaking the acoustical coupling path and ensuring the absence of echo during single-talk. However, one or more microphones are gated ON during local speech and for about one-half second thereafter, allowing echo to be returned if far-end speech is received during this time. Even in an acoustically good room requiring only 0 to 6 dB of suppression for feedback loop stability, approximately 24 to 30 dB of total suppression is needed to reduce the returned echo during this extended (by one-half second) double-talk interval to an acceptable level. When combined with the communication link delay, this results in a generally unacceptable degree of choppiness.

Another method of reducing the returned transhybrid signal uses digital signal processing techniques and is known as an "echo canceler". Fang (ibid) describes, "An echo canceler synthesizes a replica of the echo and subtracts it from the returned signal." This can result in typically a 20 dB reduction of the returned echo with no suppression of the outgoing local speech signal. This reduction is not adequate for extended single-talk, though, so the remaining echo is removed by a nonlinear processor called a center-clipper. Again, Fang (ibid) describes, "The center clipper is an energy detector which, in the presence of far-end speech, will set signals below a certain threshold to zero. The threshold can be either fixed at a low level or variable according to the level of the received far-end speech. If received speech is not present, or if near-end speech is present, the center clipper is bypassed." The action of a center clipper with an adaptive threshold is inherently bypassed in the absence of received (far-end) speech. The center clipper causes audible distortion of transmitted local (near-end) speech if not defeated during its presence.

It is important to note that while the threshold of an adaptive center clipper typically has a rapid rise time followed by a much slower fall time which varies at a syllabic or slightly sub-syllabic rate, the attenuation to off of the transmit signal occurs instantaneously based on the magnitude of the transmit signal's waveform in relation to the threshold value. This results in harmonic and intermodulation distortion of any speech present in the transmit signal, but allows more local speech energy to be transmitted than if the signal were suppressed (attenuated with syllabic time constants), thus yielding less choppiness. Since the center clipper totally attenuates the residual transmit signal in the absence of local speech and is attempted to be disengaged in the presence of detected local speech, it would appear that the center clipper could be replaced by a suppressor if the suppressor were also defeated in the presence of local speech. The action of the center clipper is subjectively preferable to the suppressor, however, during the speech presence decision transitions and when the presence of weaker local speech fails to be detected.

The echo canceler techniques have also been applied to the loudspeaker-to-microphone acoustical coupling path. It has generally been difficult or impossible to achieve any useful degree of cancellation outside the laboratory, though, especially if a multiple gated microphone system is used. In practice, however, useful echo reduction is achieved from an echo canceller device through the action of the canceler's center clipper, albeit with the tradeoff of high intermittent distortion, particularly during double-talk. If combined with a gated microphone system, such distortions are absent during single-talk. Due to the digital signal processing employed, such cancelers are narrow bandwidth devices with an upper frequency limit of typically 3 to 7 kHz.

A multi-band center clipper intended to reduce transhybrid coupling as a stand-alone device (not necessarily as part of an echo canceler device) is described by Mitchell and Berkley ("A Full-Duplex Echo Suppressor Using Center-Clipping", *The Bell System Technical Journal*, May-June 1971). Their device incorporates four to six independent adaptive center clippers operating in as many frequency bands covering the telephone bandwidth. Three sets of bandpass filters are used to (1) develop the multiple thresholds from receive signal measurement, (2) separate the transmit signal into the frequency bands before multiple center clipping of each band, and (3) filter the distortion products from each band following center clipping. The gain constant for each adaptive threshold is manually adjusted for the measured transhybrid coupling in each band. The authors report a virtual elimination of subjective echo provided the thresholds are adjusted for a specific transhybrid coupling or a worst-case coupling. Subjective distortion is reported to be virtually unnoticeable when the thresholds are adjusted for transhybrid coupling attenuations of 15 dB or greater, but becomes increasingly noticeable as the thresholds are adjusted for lower transhybrid coupling attenuations. Additionally, a brief mention is made of the multi-band center clipper's experimental application to "acoustical echo generated in an idealized 4-wire speakerphone", but no results are reported.

None of the prior art discussed above discloses an adequate means of subjectively eliminating returned echo in a teleconference system while not substantially introducing choppiness, adding perceived distortion, or restricting bandwidth.

SUMMARY OF THE INVENTION

In a principal aspect, the present invention is an improved echo reduction circuit. The circuit accepts receive and transmit signals and responsively provides an echo-reduced transmit signal.

The circuit includes a microphone signal level-measuring circuit, loudspeaker signal level-measuring circuit, comparison circuit, and controlled attenuation amplifier circuit. The microphone signal level-measuring circuit receives the transmit signal, measures the level of the signal, and provides a microphone level signal to the comparison circuit. The loudspeaker signal level-measuring circuit accepts the receive signal, measures the level of the signal, and provides a loudspeaker level signal to the comparison circuit.

In response to both the microphone level and loudspeaker level signals, the comparison circuit provides a control signal to the controlled attenuation amplifier circuit. The controlled attenuation amplifier circuit receives both the transmit and control signal. The transmit signal is attenuated in accordance with the control signal. This attenuation is a rapid time constant, semi-waveform following partial attenuation performed after preemphasis of the transmit signal and in proportion to the likely strength of the returned echo in relation to the strength of the local speech.

It is therefore an object of the present invention to provide an improved echo reduction circuit. Another object is to more effectively eliminate, subjectively, the returned echo in a teleconference system. A further object is an echo reduction circuit that is simpler, less expensive, and more easily manufactured.

It is another object of the present invention to more effectively eliminate, subjectively, the returned echo in a teleconference system while not introducing substantial choppiness. Still a another object is to more effectively eliminate, subjectively, the returned echo in a teleconference system while not adding substantial perceived distortion.

A further object of the present invention is to more effectively eliminate, subjectively, the returned echo in a teleconference system while not substantially restricting bandwidth. Still yet another object is a less complex circuit that more effectively eliminates, subjectively, the returned echo from transhybrid coupling while not substantially introducing choppiness or substantially adding perceived distortion.

These and other objects, features, and advantages of the present invention are discussed or apparent in the following description.

BRIEF DESCRIPTION OF THE DRAWING

A preferred embodiment of the present invention is described herein with reference to the drawing wherein.

DESCRIPTION OF THE PREFERRED EMBODIMENT

Figure 1:
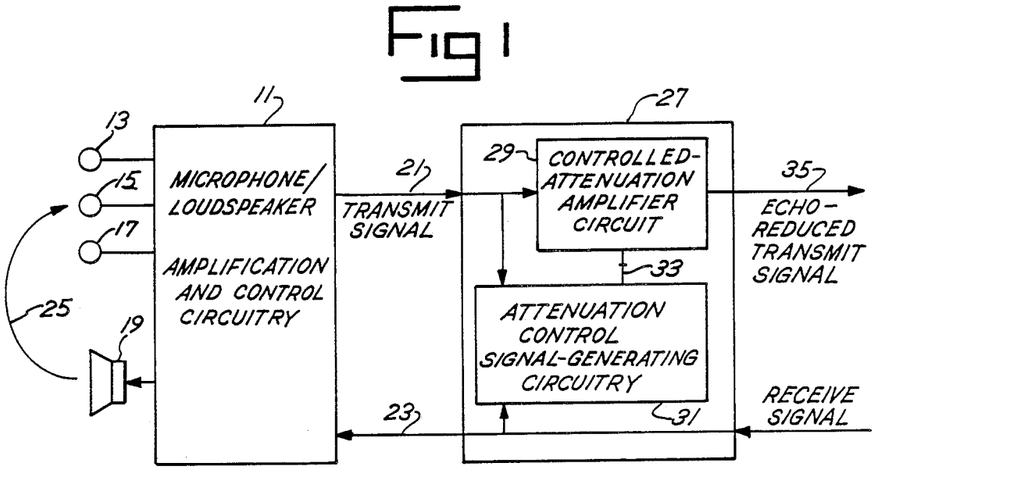
FIG. 1 is a block diagram of a preferred embodiment of a teleconference system of the present invention.

Referring to FIGS. 1-6, a preferred embodiment of a teleconference system incorporating the present invention is described. As shown in FIG. 1, microphone/-loudspeaker amplification and control circuitry 11 accepts signals from one or more conference room microphones 13, 15, and 17 to pickup near-end speech and provides drive for one or more conference room loudspeakers 19 to reproduce far-end speech. The combined microphone signal forms the transmit signal which is output along the conductor 21 at a nominal level of 0 dBm.

The receive signal is input along the conductor 23 at a nominal level of 0 dBm and forms the loudspeaker drive signal. The path 25 represents undesired acoustical coupling (including room reflections) from the loudspeaker 19 to the microphones 13-17. If the transmit and receive signals on conductors 21 and 23, respectively, are interconnected via a unity gain communication link to a similar teleconference system at the far end, then both systems must have less than 0 dB gain (greater than 0 dB attenuation) at all frequencies from their respective receive signal conductor 23 inputs to their respective transmit signal conductor 21 outputs to guarantee overall feedback loop stability. The elements 11-17 are advantageously of the type disclosed in U.S. Pat. Nos. 4,712,231, 4,489,442, and 4,658,425, previously cited.

The circuitry of the preferred embodiment comprises the circuit block 27. The receive signal on the conductor 23 passes through the circuit block 27 unaltered and unattenuated even when the outgoing transmit signal is passing through the circuit block 27 unattenuated. Therefore, the circuitry of block 27 does not improve the feedback loop stability of a teleconference system and must be used in conjunction with a system installation as represented by the elements 11-19 which already has greater than 0 dB attenuation from its receive signal conductor 23 input to its transmit signal conductor 21 output at all frequencies within its working bandwidth. In practice, the attenuation of such an installation at the worst-case frequency is 3 to 6 dB, resulting in a band-averaged attenuation of 6 to 9 dB. (Conventional echo suppressors and cancelers also require at least 6 dB band-averaged attenuation through the transhybrid coupling to function.)

While it is possible in some limited circumstances to obtain the required attenuation using conventional microphone and loudspeaker techniques, more often a teleconference system such as that described above is employed which uses automatic gating of directional microphones to allow optimization of the installation's acoustics and reduction of the acoustical coupling. The system's complementary transmit/receive path suppression is adjusted to increase the overall system attenuation from the receive signal conductor 23 input to the transmit signal conductor 21 output to greater than 0 dB at the worst-case frequency plus some safety margin, yielding the attenuation figures for this path stated above. In a well-designed teleconference room this is typically about 6 dB of suppression, which is not subjectively bothersome or even noticeable. Also, about one-half second after local speech, any microphones 13-17 which were active gate OFF, increasing the band-averaged attenuation from the 6 to 9 dB range to effectively infinite, ensuring a total absence of returned echo during extended single-talk.

The 6 to 9 dB attenuation of the returned echo during the extended (by one-half second) double-talk period need only be increased by about 24 dB to about 30 dB total to ensure subjective inaudibility of the echo due to the masking effect of the near-simultaneous local speech. (Forty dB or more of increased attenuation is needed during extended single-talk.) While the reduced attenuation increase requirement is a benefit of the microphone gating, the effect could be obtained in a system without gated microphones by "gating" the local speech signal using techniques taught in the Julstrom patent (U.S. Pat. No. 4,658,425, previously cited) or using other related techniques. A gated microphone system will be assumed in subsequent discussion.

The circuit block 27 contains a controlled-attenuation amplifier circuit 29 interposed between the transmit signal conductor 21 and an echo-reduced transmit signal conductor 35 and an attenuation control signal-generating circuitry 31 accepting inputs from the transmit signal conductor 21 and receive signal conductor 23 to produce an attenuation control signal along the conductor 33 which is input to the amplifier circuit 29 to control its attenuation.

In an alternative, preferred embodiment, the circuit block 27 could also include, for example, four buffer amplifiers. One such amplifier would accept the receive signal immediately after it enters the block; another would accept the transmit signal immediately after enters the block. Another such amplifier would supply the receive signal to the microphone/loudspeaker amplification and control circuitry 11, and the other would provide the echo-reduced transmit signal outside of the block.

Related configurations to that depicted in the circuit block 27 are also found in conventional echo suppressors and the adaptive center clipper portion of conventional echo cancelers. While the three different approaches all employ one or more controlled attenuation amplifiers to reduce the returned echo while attempting to minimally disrupt the desired speech transmission, significantly different circuitry is employed with significantly different operating characteristics.

Figure 2:
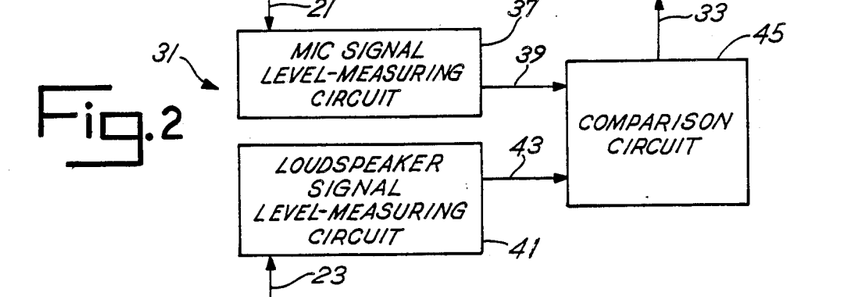
FIG. 2 is a block diagram of the attenuation control signal-generating circuitry of FIG. 1.

During the extended double-talk period, the signal level of the returning echo along conductor 21 will be 6 to 9 dB below the level of the receive signal on conductor 23, but altered in spectral balance and with an extended "trail" from the room reflections contained in the acoustical coupling path 25. Referring to FIG. 2, which is a more detailed block diagram of the circuitry 31 of FIG. 1, the loudspeaker (receive) signal level-measuring circuit 41 predicts the maximum level of the returning echo signal by scaling appropriately a measurement of the drive signal to the loudspeaker as represented by the receive signal along the conductor 23.

The receive signal is measured by a precision full-wave rectifier circuit filtered by a 1 millisecond rise time constant and a 16 millisecond fall time constant. The fall time is just sufficiently long to encompass the reverberant trail of the acoustical coupling over the path 25 of FIG. 1 in an acoustically good conference room. The rise time is sufficiently short to allow the measurement circuit to essentially reach final value before the sound from the loudspeaker 19 of FIG. 1 reaches the microphones 13-17 of FIG. 1, and also matches the rise time of the microphone (transmit) signal level-measuring circuit 37 to be described. The output of circuit 41 appears on conductor 43 for input to the comparison circuit 45.

Attack times of between 0.2 and 5 milliseconds and decay times of between 5 and 50 milliseconds could be used with the circuitry shown. As discussed, however, the preferred embodiment uses an attack time of approximately 1 millisecond and a decay time of approximately 16 milliseconds.

A similar loudspeaker signal level measurement is developed in a conventional adaptive center clipper to directly to set a threshold below which transmit signals are instantaneously fully attenuated, producing the center clipper's audibly significant nonlinear distortions. In the embodiment described, however, a proportional ratio comparison is made in the comparison circuit 45 to the microphone signal level measurement signal of the circuit 37 before the attenuation decision is made.

Like the loudspeaker signal level-measuring circuit 41, the microphone (transmit) signal level-measuring circuit 37 also incorporates a precision full-wave rectifier circuit with a 1 millisecond rise time, but has a 1 millisecond, not 16 millisecond, fall time. Attack and decay times between 0.2 and 5 milliseconds could also be used with the circuitry shown, but the preferred embodiment uses the previously-discussed time of 1 millisecond.

The equal 1 millisecond rise and fall times applied to the full-wave rectified signal in the preferred embodiment are equivalent to applying a low-pass filter with a single 159 Hz pole to the rectified signal. This signal-smoothing provides significant attenuation of all but the lowest frequencies of the audio range harmonic components of the rectified signal. Since this filtered signal is compared to the loudspeaker signal level measurement from the circuit 41 (which has even more smoothing from its 16 millisecond fall time) to determine the instantaneous attenuation applied to the transmit signal, the smoothing results in a very considerable reduction of audible harmonic and intermodulation distortion products in the echo-reduced transmit signal appearing on the conductor 35 of FIG. 1 in contrast to a circuit such as an adaptive center clipper which equivalently does not have such filtering.

Yet, the 1 millisecond smoothing is still sufficiently quick to follow the rapid moment-to-moment amplitude fluctuations characteristic of normal speech. This is in contrast to an echo suppressor which has attenuation timing decisions based on syllabic rates of approximately 50 millisecond. The output of circuit 37 appears on conductor 39 for input to comparison circuit 45.

The comparison circuit 45 accepts inputs along the conductors 39 and 43 from the microphone and loudspeaker signal level-measuring circuits 37 and 41, respectively, and responsively produces an attenuation control signal at its ouput along the conductor 33. In contrast to an adaptive center clipper, where the instantaneous magnitude of the transmit signal exceeding the threshold set by the receive signal measurement causes an instantaneous infinite attenuation of the transmit signal, the comparison circuit 45 makes a proportional calculation of the logarithm of the ratio of the measurement signals input along conductors 39 and 43 over a critical range of ratios to responsively produce the attenuation control signal along conductor 33.

The attenuation control signal reaches its maximum value when the level of the transmit signal as represented by the signal on the conductor 39 equals or exceeds the level of the receive signal as represented by the signal on the conductor 43. This results in 0 dB attenuation of the transmit signal by the controlled-attenuation amplifier circuit 29 of FIG. 1. Under this momentary condition, there is definitely local speech present (the transmit signal would be at least 6 dB below the receive signal if only echo were present), so the local speech signal should be passed, if possible. Since the local speech signal is at least as strong as the returning echo signal and will effectively mask the echo, no attenuation is needed or desired.

The attenuation control signal reaches its minimum value when the level of the receive signal as represented by the signal on the conductor 43 exceeds by 6 dB or more the level of the transmit signal as represented by the signal on the conductor 39. This results in 24 dB attentuation of the transmit signal by the controlled-attenuation amplifier circuit 29 of FIG. 1. Under this momentary condition, the transmit signal may be entirely returning echo and the attenuation should be the amount necessary to assure subjective inaudibility of the echo (previously established as 24 dB). This also, of course, momentarily attenuates by 24 dB any local speech signal which may also be present, but only when, on a 1 millisecond by 1 millisecond basis, the local speech drops 6 dB or more below the received distant speech. This will occur only on a rapid, intermittent, and occasional basis during weaker moments of the local speech waveforms (as rectified and filtered by the circuit 37). These momentary partial dropouts in the local speech are essentially inaudible with normal conversational patterns due to the redundant and impulsive nature of speech sounds.

Attenuating only 24 dB, rather than infinitely, reduces significantly the audibility of such momentary dropouts. While attenuating 40 dB or more would also provide a working circuit, the attenuation of the preferred embodiment is approximately 24 dB.

As the logarithm (dB representation) of the ratio of receive signal level to transmit signal level varies from 0 to 6 dB, the attenuation control signal varies linearly from its maximum to its minimum value and proportionally increases the attenuation of the tranmit signal linearly (not in proportional dB) from 0 to 24 dB (94% attenuation). At a ratio of 3 dB, the transmit signal is attenuated 47%, or 5.5 dB. Thus, the attenuation of the transmit signal occurs smoothly with no discontinuities or abrupt transitions in its waveform.

This, along with the smoothing of the transmit signal level measurement previously discussed, minimizes the generation of particularly the higher frequency distortion products, which are the most audible and annoying. Also, the gradual decrease in attenuation as the transmit signal becomes greater than a value 6 dB below the receive signal means that an occasional returning echo sound which may exhibit less than the assumed 6 dB acoustical coupling attenuation will not suddenly and annoyingly break over a threshold and be passed without any echo reduction.

Returning to FIG. 1, the controlled-attenuation amplifier circuit 29 attenuates the transmit signal on the conductor 21 in response to the attenuation control signal on the conductor 33 as just described to produce the echo-reduced transmit signal at its output on the conductor 35 for transmission over the communication link to the far end. Prior to attenuating the transmit signal, the amplifier circuit 29 applies preemphasis (high frequency boost) to it with a 6 dB/octave asymptotic slope from 1 kHz to kHz. Complementary deemphasis (except for a continued rolloff above 20 kHz) is applied following the echo reduction attenuation to yield an overall flat frequency response from about 30 Hz to 20 kHz. The deemphasis following the echo reduction attenuation further reduces any annoying higher frequency distortion products generated by the rapidly varying transmit signal attenuation. As an aside, the preemphasis/deemphasis function could be extended below 1 kHz, but there is little further audible benefit in doing so, and practical circuit design problems then arise due to the low level of the low frequency signals passing through the attenuation stage.

The elements of FIGS. 1 and 2, then, comprise a complete teleconference installation for interconnection through a communication link, which may include a satellite, to an advantageously similar installation at the far end. With acoustically well-designed rooms, subjectively echo free conversation is made possible, without audible choppiness, perceived distortion, or substantially restricted bandwidth.

As is evident, nothing in the preceding discussion prevents the application of the invention to the echo resulting from tranhybrid coupling. Specifically, the elements 11-19 of FIG. 1 could be replaced by a four-to-two wire conversion hybrid with at least 6 dB band-averaged transhybrid attenuation, and the functional description of the present invention would remain essentially unchanged. The bandwidth requirement could, of course, be reduced, and the loudspeaker signal level-measuring circuit 41 of FIG. 2 could have a shortened fall time of optimally about 3 milliseconds (or workably as short as .5 milliseconds) due to the shortened impulse response of the transhybrid coupling in comparison to the acoustical coupling 25 of FIG. 1. This variation of the invention could be used within the telephone communications network where presently conventional echo suppressors and echo cancelers are employed to reduce hybrid-induced echo.

FIGS. 3-6 are schematic diagrams of the preferred embodiment implementation of the circuit blocks of FIGS. 1 and 2 of the present invention. Although implemented in analog circuitry, the functions may equivalently be implemented with digital processing techniques when this approach is more expedient, as is evident.

Figure 3:
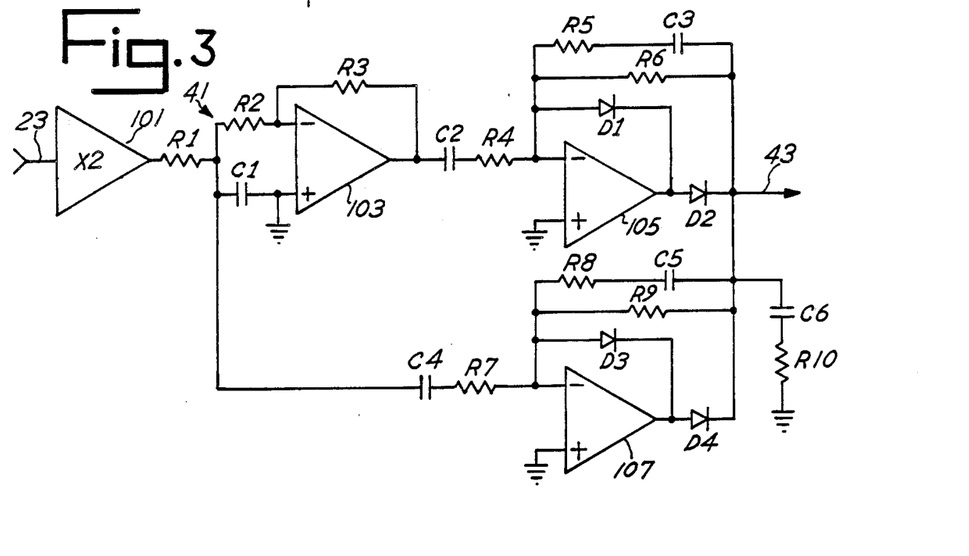
FIG. 3 is a schematic diagram of the loudspeaker signal level-measuring circuit of FIG. 2.

FIG. 3 is a schematic diagram of the loudspeaker signal level-measuring circuit 41 of FIG. 2. The buffer amplifier 101 amplifies the receive signal on the conductor 23 by a factor of two and isolates the conductor 23 from loading by the following rectifier circuit. The resistors R1-R10, capacitors C1-C6, diodes D1-D4 (all diodes are type 1N4148 or equivalent), and operational amplifiers ("op amps") 103-107 (all op amps are conventional integrated circuit types, Raytheon RC4156 or equivalent, connected to regulated 15 volt supplies in a conventional manner) form a precision full-wave rectifier with audio input bandpass filtering and rectified output smoothing filtering.

The resistors R1, R2, R4, and R7 and capacitors C1, C2, and C4 provide 6 dB/octave rolloffs below 300 Hz and above 6 kHz to center the echo reduction attenuation control circuitry's sensitivity in the most audibly significant frequency range. (Identical frequency shaping is employed in the microphone signal level-measuring circuit 37 of FIG. 2.) The resistors R6 and R9 and capacitors C3 and C5 determine the rise time of the rectified output developed at conductor 43 at a 1 millisecond time constant. The resistors R6 and R9 and capacitors C3, C5, and C6 in conjunction with the circuit-loading effect of R24 of FIG. 5 determine the fall time of the rectified output at a 16 millisecond time constant. The resistors R5, R8, and R10 are of a low, noncritical value and aid op amp stability in the circuit configuration. The midband gain of the rectifier circuit is determined by the resistors R1-R4, R6, R7, and R9. Including the gain of buffer amplifier 101, the gain from the average signal magnitude value (assuming a sine wave input) on the conductor 23 to the DC level on conductor 43 is a factor of 14.

Figure 4:
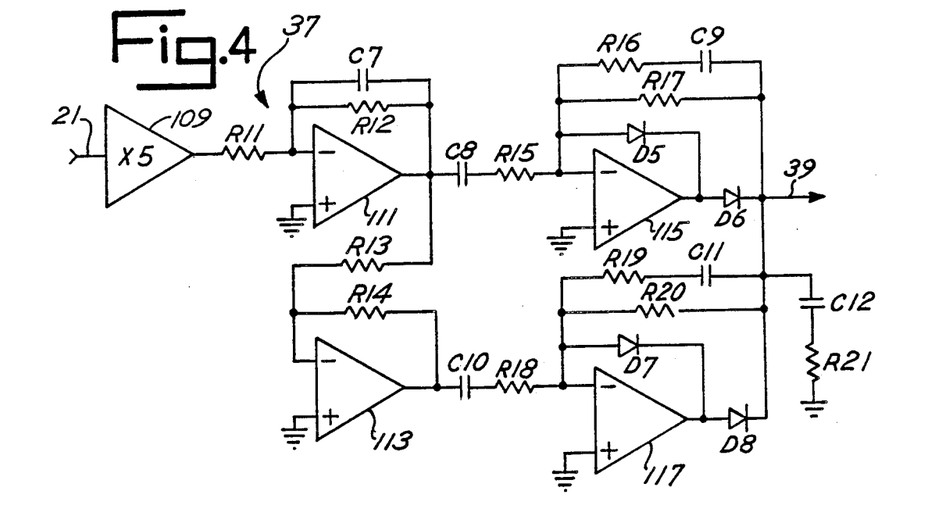
FIG. 4 is a schematic diagram of the microphone signal level-measuring circuit of FIG. 2.

FIG. 4 is a schematic diagram of the microphone signal level-measuring circuit 37 of FIG. 2. The buffer amplifier 109 amplifies the transmit signal on conductor 21 by a factor of five and isolates conductor 21 from loading by the following rectifier circuit. The resistors R11-R21, capacitors C7-C12, diodes D5-D8, and op amps 111-117 form a precision full-wave rectifier with audio input bandpass filtering and rectified output smoothing filtering.

The resistors R12, R15, and R18 and capacitors C7, C8, and C10 provide 6 dB/octave rolloffs below 300 Hz and above 6 kHz, matching those provided in circuit 41 of FIG. 2. The resistors R17 and R20 and capacitors C9 and C11 determine the rise time of the rectified output developed at conductor 39 at a 1 millisecond time constant. The resistors R17 and R20 and capacitors C9, C11, and C12 in conjunction with the circuit-loading effect of the resistor R22 of FIG. 5 determine the fall time of the rectified output at a 1 millisecond time constant. The resistors R16, R19, and R21 are a low, noncritical value and are again to aid op amp stability in the circuit configuration. The midband gain of the rectifier circuit is determined by the resistors R11-R15, R17, R18, and R20. Including the gain of the buffer amplifier 109, the gain from the average signal magnitude value (again assuming a sine wave input) on the conductor 21 to the DC level on the conductor 39 is a factor of 10. This is a factor of 1.4 (3 dB) less than the gain of circuit 41 of FIG. 2.

Figure 5:
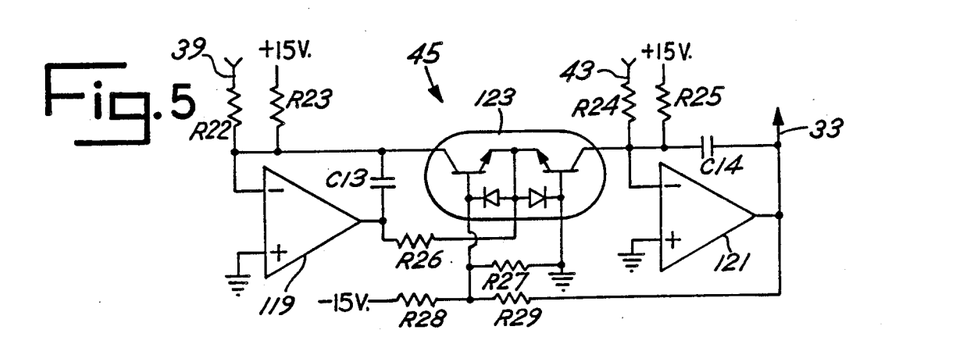
FIG. 5 is a schematic diagram of the comparison circuit of FIG. 2.

FIG. 5 is a schematic diagram of the comparison circuit 45 of FIG. 2. The resistors R22-R29, capacitors C13 and C14, op amps 119 and 121, and precision-matched dual NPN transistor 123 (National Semiconductor LM394 or equivalent) form a logarithmic ratioing circuit of conventional design except for the scaling effects of the resistors R27-R29. The resistor R26 and capacitors C13 and C14 stabilize the circuit. The circuit calculates the logarithm of the ratio of the microphone signal level measurement from the circuit 37 of FIG. 2 appearing on the conductor 39 to the loudspeaker signal level measurement from the circuit 41 of FIG. 2 appearing on the conductor 43 and outputs the resultant attenuation control signal on conductor 33. This is equivalent to calculating the difference in dB of the two quantities. The resistors R27-R29 determine the scale factor and offset such that the signal on the conductor 33 is at its maximum value of +13.5 volts when the signal input on the conductor 39 is greater than or equal to a value 3 dB below the signal input on the conductor 43. The signal on conductor 33 is at its minimum value of −13.5 volts when the signal on the conductor 39 is less than or equal to a value 9 dB below the signal on the conductor 43. When the decibel difference of the signals on the conductors 39 and 43 is between these values, the signal on the conductor 33 varies linearly proportional to the decibel difference. When the 3 dB difference in the effective scale factors of the circuits 37 and 41 of FIG. 2 is added in, the desired variation of the attenuation control signal on the conductor 33 from maximum to minimum as the decibel difference of the receive and transmit signals on the conductors 21 and 23 of FIG. 1, respectively varies from 0 to 6 dB is achieved. The resistors R23 and R25 set the lower limit of the dynamic range of the circuit 45 such that the receive signal level on the conductor 23 of FIG. 1 must be greater than a value about 40 dB below the nominal operating level of 0 dBm to lower the signal on the conductor 33 from its maximum value.

Figure 6:
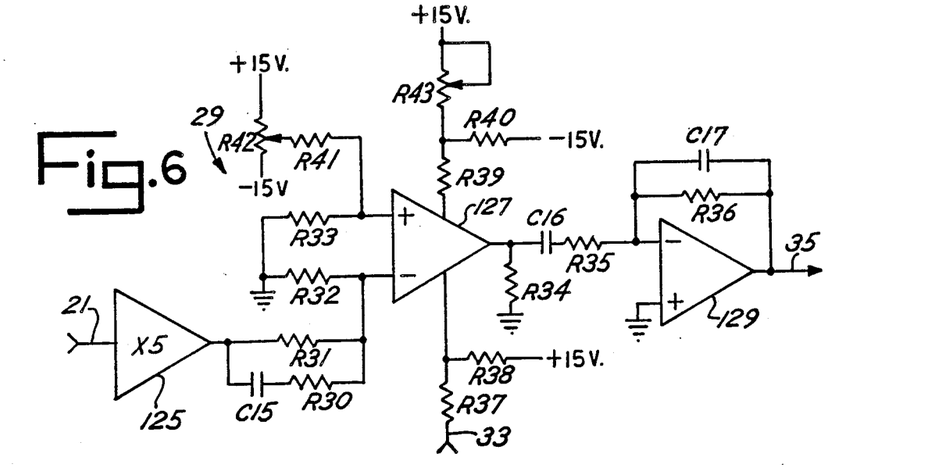
FIG. 6 is a schematic diagram of the controlled-attenuation amplifier circuit of FIG. 1.

FIG. 6 is a schematic diagram of the controlled-attenuation amplifier circuit 29 of FIG. 1. The buffer amplifier 125 amplifies the transmit signal on the conductor 21 by a factor of five for the convenience of the following voltage-controlled amplifier circuit and isolates the conductor 21 from loading by the circuit. It may advantageously be the same circuit as the buffer amplifier 109 of FIG. 4. The resistors R30–R43, capacitors C15–C17, variable transconductance amplifier 127 (one-half of an RCA CA3280 or equivalent), and op amp 129 comprise a voltage controlled amplifier circuit of conventional design except for the preemphasis and deemphasis incorporated and the specific attenuation control scaling employed. The variable resistor R43 in conjunction with the resistors R39 and R40 trim the circuit gain to compensate for component tolerances (primarily variations in the amplifier 127). The variable resistor R42, in conjunction with the resistors R31–R33 and R41, trims the DC output offset of the amplifier 127 to minimize variation in the offset as the gain of the amplifier 127 is varied in response to the attenuation control signal on the conductor 33.

The resistors R37 and R38 scale and offset the attenuation control signal on the conductor 33 to produce a control signal input to the amplifier 127. The control signal input varies the net attenuation from the conductor 21 to the circuit output on the conductor 35 from no attenuation (0 dB), when the signal on the conductor 33 is at maximum, to 94% (24 dB), when the signal on the conductor 33 is at minimum, and linearly in between. The capacitor C15 and resistors R30 and R31, in conjunction with the resistors R32, R33, R41, and R42 and the input impedance of the amplifier 127, provide a preemphasis boost starting at 1 kHz and stopping at 20 kHz. The resistor R36 and capacitor C17 provide a deemphasis rolloff also starting at 1 kHz, but continuing beyond 20 kHz, resulting in a net flat frequency response to 20 kHz with an ultrasonic rolloff. The low frequency rolloff is arbitrarily set at 30 Hz by the capacitor C16, resistors R34 and R35 and the output impedance of the amplifier 127.

The following circuit values are given:

| Resistors | Resistance |
|---|---|
| R1 | 470 |
| R2, R3, R13, R14, R34 | 20 K |
| R4, R7 | 1.5 K |
| R5, R8, R10, R16, R19, R2 | 110 |
| R6, R9, R17, R20, R22, R24 | 10 K |
| R11, R12 | 27 K |
| R15, R18, R26 | 5.1 K |
| R23, R25 | 1.5 M |
| R27 | 100 |
| R28, R39 | 82 K |
| R29, R31 | 150 K |
| R30, R32, R33 | 4.3 K |
| R35 | 36 K |
| R36 | 68 K |
| R37 | 62 K |
| R38 | 910 K |
| R40 | 220 K |
| R41 | 510 K |
| R42, R43 | 100 K trimpot |

| Capacitors | Capacitance |
|---|---|
| C1 | .068 µF |
| C2, C4 | .27 µF |
| C3, C5, C8, C9, C10, C11, C12, C16 | .6 µF |
| C6 | 4.7 µF |
| C7, C15 | .001 µF |
| C13, C14 | 150 pF |
| C17 | .0022 µF |

A preferred embodiment of the present invention has been described herein. It is to be understood, however, that changes and modifications can be made without departing from the true scope and spirit of the present invention.

Thus, for example, the described circuit could be reconfigured using digital electronics; such a reconfigured circuit would, of course, fall within the scope and spirit of the invention. This true scope and spirit are defined by the following claims, to be interpreted in light of the foregoing specification.

I claim:

1. An echo reduction circuit for accepting receive and transmit signals, where each of said signals exhibits a level, and responsively providing an echo-reduced transmit signal, comprising, in combination:

microphone signal level-measuring means for receiving said transmit signal, measuring said level exhibited by said transmit signal, and responsively providing a microphone level signal, said microphone signal level-measuring means defining attack and decay times for said microphone level signal, said attack and decay times providing audio frequency range filtering of said microphone level signal at a rate faster than a syllabic rate;

loudspeaker signal level-measuring means for accepting said receive signal, measuring said level exhibited by said receive signal, and responsively providing a loudspeaker level signal;

comparison means for receiving said microphone level and loudspeaker level signals and responsively providing a control signal having an instantaneous value dependent solely on the instantaneous values of said microphone level and loudspeaker level signals and independent of the prior values of said microphone level and loudspeaker level signals; and controlled attenuation means for receiving said control and transmit signals and responsively providing said echo-reduced transmit signal, and having an attenuation value dependant solely on the instantaneous value of said control signal and independent of the prior values of said control signal.

2. An echo reduction circuit as claimed in claim 1 wherein said microphone signal level measuring means includes both a rectifier and a filter.

3. An echo reduction circuit as claimed in claim 1 wherein said microphone signal level-measuring circuit defines attack and decay times for said microphone level signal, said attack and decay times substantially being between 0.2 and 5 milliseconds.

4. An echo reduction circuit as claimed in claim 3 wherein said loudspeaker signal level-measuring circuit defines attack and decay times for said loudspeaker level signal, said loudspeaker level signal attack time substantially being between 0.2 and 5 milliseconds and said loudspeaker level signal decay time substantially being between 5 and 50 milliseconds.

5. An echo reduction circuit as claimed in claim 3 or 4 wherein said control signal is substantially proportional to a ratio of said microphone level and loudspeaker level signals over a predetermined substantially non-zero range of said ratios.

6. A circuit for reducing hybrid-induced echo signals, said circuit accepting receive and transmit signals, where each of said signals exhibits a level, and responsively providing an echo-reduced transmit signal, comprising, in combination:
- microphone signal level-measuring means for receiving said transmit signal, measuring said level exhibited by said transmit signal, and responsively providing a microphone level signal;
- loudspeaker signal level-measuring means for receiving said receive signal, measuring said level exhibited by said receive signal, and responsively providing a loudspeaker level signal, said loudspeaker signal level-measuring means defining attack and decay times for said loudspeaker level signal, said attack time substantially being between 0.2 and 5 milliseconds and said decay time substantially being between 0.5 and 50 milliseconds;
- comparison circuit means for receiving said microphone level and loudspeaker level signals and responsively providing a control signal having an instantaneous value dependent solely on the instantaneous values of said microphone level and loudspeaker level signals and independent of the prior values of said microphone level and loudspeaker level signals; and
- controlled attenuation amplifier means for receiving said control and transmit signals and responsively providing said echo-reduced transmit signal, having an attenuation value dependent solely on the instantaneous value of said control signal and independent of the prior values of said control signal.

7. An echo reduction circuit as claimed in claim 6 wherein said controlled attenuation amplifier circuit attenuates said transmit signal by less than 40 decibels.

8. An echo reduction circuit as claimed in claim 6 wherein said controlled attenuation amplifier circuit attenuates said transmit signal by less than 25 decibels.

9. An echo reduction circuit for accepting receive and transmit signals, where each of said signals exhibits a level, and responsively providing an echo-reduced transmit signal,
- each of said transmit and echo-reduced transmit signals exhibiting both low frequency and high frequency components, and each low frequency component and each high frequency component occupying respectively substantially identical frequency ranges within an audible frequency range of 30 Hz to 20,000 Hz, comprising, in combination:
- a microphone signal level-measuring circuit for receiving said transmit signal, measuring said level exhibited by said transmit signal, and responsively providing a microphone level signal;
- a loudspeaker signal level-measuring circuit for receiving said receive signal, measuring said level exhibited by said receive signal, and responsively providing a loudspeaker level signal;
- comparison means for receiving said microphone level and loudspeaker level signals and responsively providing a control signal having an instantaneous value dependent solely on the instantaneous values of said microphone level and loudspeaker level signals and independent of the prior values of said microphone level and loudspeaker level signals and;
- a controlled attenuation amplifier circuit for receiving said control and transmit signals and responsively providing aid echo-reduced transmit signal, and having an attenuation value dependent solely on the instantaneous value of said control signal and independent of the prior values of said control signal, said controlled attenuator means including a pre-emphasis stage, attenuation stage, and de-emphasis stage;
- said pre-emphasis stage receiving said transmit signal, boosting said high frequency component of said transmit signal relative to said low frequency component of said transmit signal by a first amount, and providing a pre-emphasized transmit signal to said attenuation stage,
- said attenuation stage receiving said control signal, responsively attenuating said pre-emphasized transmit signal, and providing an attenuated signal exhibiting both low frequency components and high frequency components occupying respectively substantially identical frequency ranges within said audible frequency range as said transmit signal low and high frequency components, and
- said de-emphasis stage receiving said attenuated signal, reducing said high frequency component of said attenuated signal relative to said low frequency component of said attenuated signal by a second amount substantially complementary to said first amount, and providing said echo-reduced transmit signal.

10. An echo reduction circuit for accepting receive and transmit signals, wherein each of said signals exhibits a level, and responsively providing an echo-reduced transmit signal, each of said transmit and echo-reduced transmit signals exhibiting both low frequency and high frequency components, and each low frequency component and each high frequency component occupying respectively substantially identical frequency ranges within an audible frequency range of 30 Hz to 20,000 Hz, comprising, in combination:
- a microphone signal level-measuring circuit for receiving said transmit signal, measuring said level exhibited by said transmit signal, and responsively providing a microphone level signal, said microphone signal level-measuring circuit defining attack and decay times for said microphone level signal, said attack and decay times substantially being between 0.2 and 5 milliseconds;
- a loudspeaker signal level-measuring circuit for receiving said receive signal, measuring said level exhibited by said receive signal, and responsively providing a loudspeaker level signal;
- a comparison circuit for receiving said microphone level and loudspeaker level signals and responsively providing a control signal having an instantaneous value dependent on said microphone level and loudspeaker level signals and substantially independent of said signals' past history, said control signal being related by a constant of proportionality to the values of the logarithms of the ratios of said microphone level and loudspeaker level signals over a predetermined, substantially non-zero continuous range of said values; and
- a controlled attenuation amplifier circuit for receiving said control and transmit signals and responsively providing said echo-reduced transmit signal, said controlled attenuation amplifier circuit having an attenuation value dependent on said control signal instantaneous value and substantially independent of said value's past history, and attenuating said transmit signal by a finite decibel amount to provide said echo-reduced transmit signal, said controlled attenuation amplifier circuit including a pre-emphasis stage, attenuation stage, and de-emphasis stage, and said pre-emphasis stage receiving said transmit signal, boosting said high frequency component of said transmit signal relative to said low frequency component of said transmit signal by a first amount, and providing a pre-emphasized transmit signal to said attenuation stage, said attenuation stage receiving said control signal, responsibly attenuating said pre-emphasized transmit signal, and providing an attenuated signal exhibiting both low frequency and high frequency components occupying respectively substantially identical frequency ranges within said audible frequency range as said transmit signal low and high frequency components, and said de-emphasis stage receiving said attenuated signal, reducing said high frequency component of said attenuated signal relative to said low frequency component of said attenuated signal by a second amount substantially complementary to said first amount, and providing said echo-reduced transmit signal.

* * * * *